Nov. 3, 1970           J. L. EVANS           3,537,324
FREE ROTOR GAS BEARING GYROSCOPE
Filed Sept. 13, 1968
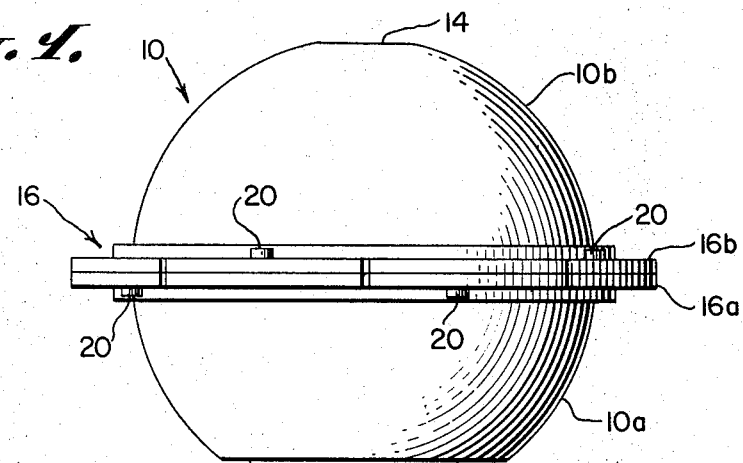
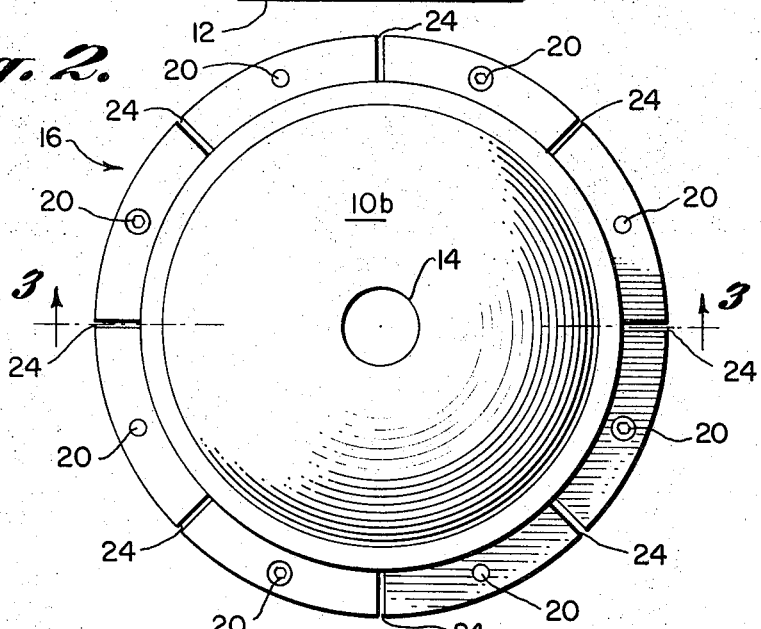
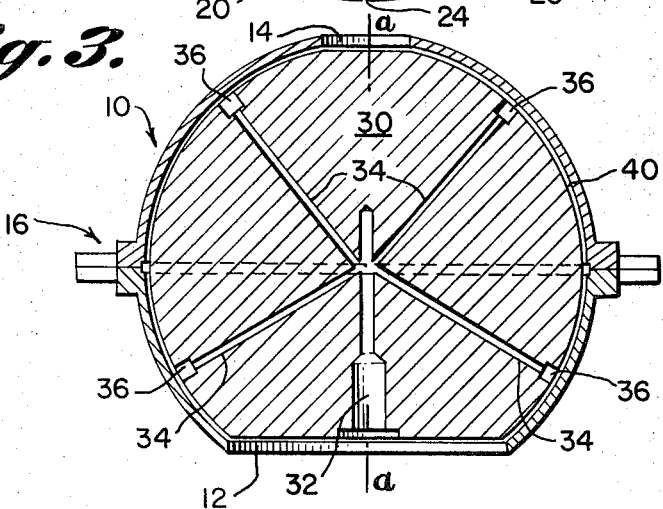
INVENTOR
JOHN L. EVANS
BY
ATTORNEY

United States Patent Office 3,537,324
Patented Nov. 3, 1970

3,537,324
FREE ROTOR GAS BEARING GYROSCOPE
John L. Evans, Oakland, N.J., assignor to Singer-General Precision, Inc., Little Falls, N.J., a corporation of Delaware
Filed Sept. 13, 1968, Ser. No. 759,661
Int. Cl. G01c 19/06
U.S. Cl. 74—5                            3 Claims

ABSTRACT OF THE DISCLOSURE

A free rotor gas bearing gyroscope in which the thickness of the wall of the rotor is small enough to permit it to distort under the pressure of the bearing gas to assume a substantially perfect spherical shape and thus correct for machine errors.

BACKGROUND OF THE INVENTION

This invention relates to a gas bearing gyroscope and, more particularly, to such a gyroscope having a flexible, substantially spherical hollow rotor extending over, and rotating with respect to, a substantially spherical stator.

Free rotor gas bearing gyroscopes are generally known and feature the use of pressurized gas injected into the space or "running gap" between the rotor and stator to provide a bearing for the rotation of the rotor. However, machine tolerances are such that these running gaps are often irregular and therefore severely limit the degree of accuracy and precision of the instrument.

SUMMARY OF THE INVENTION

It is therefore an object of the present invention to provide a gyroscope of the above type in which a substantially uniform running gap between the stator and the rotor is insured.

Briefly summarized, the gyroscope of the present invention includes a flexible substantially spherical hollow rotor extending over a substantially spherical stator and defining therewith a running gap for a pressurized bearing gas. The thickness of the wall of the rotor is relatively small so that it will distort under the pressure of the gas to insure a substantially constant running gap.

BRIEF DESCRIPTION OF THE DRAWINGS

Reference is now made to the accompanying drawings for a better understanding of the nature and objects of the gyroscope of the present invention, which drawings illustrate the best mode presently contemplated for carrying out the objects of the invention and its principles, and are not to be construed as restrictions or limitations on its scope. In the drawings:

FIG. 1 is a front elevational view of the assembly of the present invention;

FIG. 2 is a top plan view of the assembly of the present invention; and

FIG. 3 is a vertical cross-sectional view taken along the line 3—3 of FIG. 2.

DESCRIPTION OF THE PREFERRED EMBODIMENTS

Referring specifically to FIGS. 1 and 2 of the drawings, the reference numeral 10 refers to a flexible, substantially spherical hollow rotor which consists of two substantially hemispheres 10a and 10b. The hemisphere 10a forms the base portion of the sphere and has an opening 12 formed through the bottom thereof, and the hemisphere 10b forms the top portion of the sphere and has an opening 14 formed through the top thereof, which is of a smaller diameter than the hole 12, the purpose of these holes being described in detail later.

A circular flange 16 is provided on the rotor 10 for the purpose of connecting the two hemispheres 10a and 10b together, the flange 16 being formed by a pair of flange members 16a and 16b extending from the hemispheres 10a and 10b, respectively. A plurality of fastening members 20 extend through holes in the flange 16, with their enlarged head portions extending alternately from the upper and lower surfaces of the flange 16, as shown. A plurality of radial notches are formed through the flange 16 to reduce its stiffness, for reasons that will be explained in detail later.

The rotor 10 is adapted to be assembled over a fixed stator 30 as shown in FIG. 3, the latter consisting of a substantially solid spherical member having a flat bottom portion, and a conduit system for the transfer of pressurized fluid such as gas, to the outer surface of the sphere. Specifically, the latter system consists of a central passage 32 which receives the pressurized gas through the hole 12 from an external source (not shown) and distributes it to a plurality of auxiliary passages 34, each of which terminate in a nozzle 36 at the surface of the sphere. As an example of the number and position of the auxiliary passages 34 that can be utilized, there can be 12 passages disposed equiangularly in the bottom portion of the stator, each extending approximately 30° with respect to the horizontal and 12 passages disposed equiangularly in the top portion of the stator, each extending approximately 50° with respect to the horizontal—for a total of 24 passages.

The pressurized gas is injected into the running air gap 40 to provide a bearing for the rotation of the rotor 10 with respect to the stator 30 about axis a—a, after which the gas exits through the holes 12 and 14 and, if equatorial venting is desired, through the slots 24 of the flange 16 after collecting in a notch formed in the inner surface of the rotor 10 and registering with the slots 24. According to a main feature of the present invention, the rotor 10 is provided with an extremely thin wall. For example, a rotor having a diameter of approximately 2.00 inches will have a wall thickness of approximately 0.05 inch—a ratio of approximately 40:1. In this manner, when the pressurized fluid is disposed in the running gap 40 between the rotor and the stator, the rotor shell "inflates" slightly, especially along the inner wall portions thereof which were normally of a slightly less radius than the remaining portions due to machining defects, etc. As a result of the expansion, or change in radius, a substantially uniform running gap is maintained between the rotor and the stator. For example, when the hoop stress in the rotor exceeds 1,000 lb. per square inch and the rotor is made of a magnesium alloy, the radius of the rotor increases by approximately 90 micro inches. Of course, the provision of the slots 20 on the flange 16 to reduce its stiffness insures that the flange does not resist the above changes in the shape of the shell in its equatorial plane.

It is understood that the rotor may be driven about its vertical axis a—a in any known manner. For example, tangential openings may be provided in the nozzles 36 so that the gas from the passages 34 is discharged in a direction which is substantially tangential to the circumferential outer surface of the stator creating a reaction force which drives the rotor as well as forming a bearing for same, as disclosed in U.S. Pat. 3,115,784. As an alternate to this, the rotor 10 may be driven by utilizing a plurality of gas nozzles disposed externally of the rotor and adapted to direct their jets into a plurality of turbine bucket grooves formed in the outer peripheral edge of the flange 16, as disclosed in U.S. pat application Ser. No. 489,913 filed Sept. 29, 1965, of which applicant is a co-inventor.

Similarly, any type of known pick-off means can be provided to detect any displacement of the rotor 10 with respect to the stator 30. For example, the gas pick-off means disclosed in the above application can be utilized, in which case the pressurized gas is discharged from the gap 40 through the hole 14 in the rotor and into the pick-off means. Also, the pick-off means can be optical, capacitive or magnetic.

The advantages of the gyroscope of the present invention are many. For example, as a result of the thin structure of the rotor member, it has a very low mass, which enhances the vibration resistance and shock resistance of the assembly. Also, as a result of the nearly perfect sphericity of the bearing surfaces, random error-producing torques caused by the viscous flow of the bearing gas are minimized, which results in very small random drift errors.

It can be understood that the above disclosed invention can be applied to any environment requiring a high-speed rotation of a rotor member with respect to a stator member and it is not necessarily limited to gyroscopic applications.

Of course, other variations of the specific construction and arrangement of the gyroscope disclosed above can be made by those skilled in the art without departing from the invention as defined in the appended claims.

I claim:

1. In combination, a substantially spherical stator member, a flexible substantially spherical hollow rotor member extending over said stator member in spaced relation thereto, said rotor member being adapted to rotate with respect to said stator member, a pressurized fluid extending in the space between said stator member and said rotor member to act as a bearing, the thickness of the wall of said rotor member being small enough to permit the rotor member to change in shape under the pressure of said fluid to correct for machining defects and thus maintain a substantially uniform space between said members.

2. The combination of claim 1 wherein said rotor member has a circular flange extending from its outer surface, said flange having radial notches extending therethrough at predetermined intervals to decrease its resistance to said change in shape of said rotor member.

3. The combination of claim 1 wherein the ratio of diameter of said rotor member to the thickness of its wall is approximately 40 to 1.

References Cited

UNITED STATES PATENTS

| | | | |
|---|---|---|---|
| 2,597,371 | 5/1952 | Perkins et al. | |
| 3,071,976 | 1/1963 | Kunz | 74—5.6 |
| 3,262,327 | 7/1966 | Cohen | 74—5 |
| 3,295,378 | 1/1967 | Jensen et al. | 74—5.7 XR |
| 3,320,816 | 5/1967 | Johnston | 74—5.7 XR |

MANUEL A. ANTONAKAS, Primary Examiner

U.S. Cl. X.R.

308—9